United States Patent [19]

Otsuki et al.

[11] 4,418,305
[45] Nov. 29, 1983

[54] VELOCITY FEEDBACK CIRCUIT

[75] Inventors: Haruaki Otsuki, Shimoinayoshi; Hiromu Hirai, Yatabemachi, both of Japan

[73] Assignee: Hitachi, Ltd., Tokyo, Japan

[21] Appl. No.: 292,802

[22] Filed: Aug. 14, 1981

[30] Foreign Application Priority Data

Aug. 27, 1980 [JP] Japan ............................... 55-117109

[51] Int. Cl.³ .............................................. G05B 5/01
[52] U.S. Cl. ..................................... 318/616; 318/572
[58] Field of Search ............... 318/616, 617, 618, 615, 318/572

[56] References Cited

U.S. PATENT DOCUMENTS 3,241,015 3/1966 Allen .............................. 318/617 X
4,064,444 12/1977 Hoang ............................ 318/615 X
4,215,403 7/1980 Pollard et al. .................. 318/617 X
4,242,622 12/1980 Shepard, Jr. ................... 318/617 X Primary Examiner—B. Dobeck
Attorney, Agent, or Firm—Antonelli, Terry & Wands

[57] ABSTRACT

A velocity feedback circuit for a position servomechanism operative to control the position of a controlled object on the basis of the signal indicative of the difference between the position error and the velocity fed back to the input, wherein a velocity calculating circuit is provided to calculate the velocity to be fed back to the input of the position servomechanism on the basis of the relation between the time required for the controlled variable of the controlled object to make a predetermined change and the predetermined change of the controlled variable.

5 Claims, 7 Drawing Figures

VELOCITY FEEDBACK CIRCUIT

BACKGROUND OF THE INVENTION

1. Field of the Invention

This invention relates to a velocity feedback circuit for a position servomechanism, and more particularly to a velocity feedback circuit suitable for application to a position servomechanism in which the position of a controlled object is detected by quantization of the position.

2. Description of the Prior Art

Addition of a velocity feedback circuit to a position servomechanism has been proposed as one of methods for compensating the operating characteristic of the position servomechanism. One form of the velocity feedback circuit widely used in this field hitherto has generally been so constructed that a tachometer generator for detecting the velocity of a controlled object is provided in combination with a position detector detecting the position of the controlled object, and the output from the position detector is fed back to find the error between the detected position and the desired position, the output from the tachometer generator being then subtracted from the value of the position error. In this connection, it has been the recent tendency that a position detector such as a position encoder quantizing the position of a controlled object is frequently used as the position detector for the position servomechanism.

In a position servomechanism provided with a velocity feedback circuit of the kind above described, it is necessary to install the tachometer generator in the control part of the position servomechanism. However, it is generally difficult to additionally install the tachometer generator in the control part of the position servomechanism provided already with the position detector, due to the lack of available space from the dimensional aspect. Therefore, it is not desirable to add the velocity feedback circuit of the above kind to the position servomechanism when the object is to improve the operating characteristic of the position servomechanism mounted on an apparatus.

As another example of the velocity feedback circuit for a position servomechanism using a quantizing position detector, it has been proposed to use, in place of the tachometer generator, a frequency-to-voltage converter (which will be referred to hereinafter as an FV converter) which converts a frequency into a voltage utilizing the output pulse generated at the end of each quantizing period of the output signal from the position detector thereby obtaining a voltage signal proportional to the velocity. Thus, the FV converter is essentially required in the latter example of the velocity feedback circuit although the provision of the tachometer generator is unnecessary.

In each of the two examples described above, the velocity is detected in the form of an analog quantity. Therefore, the velocity feedback circuit is so constructed that the position error is also converted into an analog quantity, and an analog circuit executes subtraction of the velocity from the position error. However, an analog circuit is disadvantageous in that it is susceptible to variations in the power supply voltage and variations in the characteristics of its circuit elements and that many steps of troublesome adjustment are required. Therefore, attention is now being increasingly directed to a so-called digital position servomechanism in which the velocity in digital quantity is subtracted from the position error also in digital quantity, and an amplifier disposed in the stage preceding the controlled object is actuated in response to the result of subtraction. A digital velocity feedback circuit, which is suitable for application to such a digital position servomechanism and detects the velocity in the form of a digital quantity, has been proposed and is disclosed in, for example, Japanese Patent Application Laid-open No. 19880/77. The disclosed digital velocity feedback circuit is so constructed that the value of displacement of a controlled object during a predetermined time is calculated at intervals of the predetermined time, and the calculated displacement value is multiplied by the reciprocal of the predetermined time described above so as to calculate the velocity to be fed back. However, such a circuit requires, for the velocity detection, a relatively long time equal to the duration corresponding to the movement of the controlled object over a distance of several units of quantized displacement. Consequently, the disclosed digital velocity feedback circuit is defective in that such a manner of velocity detection results in a large delay time, and the dynamic characteristic of the position servomechanism is not fully improved.

SUMMARY OF THE INVENTION

With a view to obviate the prior art defect pointed out above, it is a primary object of the present invention to provide a velocity feedback circuit for application to a position servomechanism, which does not require a velocity detecor, and yet, which can attain feedback of velocity with a greatly shortened delay time.

The present invention is featured by the fact that the velocity feedback circuit for a position servomechanism comprises means for calculating the velocity of a controlled object by measuring the period of time during which the controlled object displaces by a predetermined amount.

The above and other objects, features and advantages of the present invention will become apparent from the following detailed description taken in conjunction with the accompanying drawings.

DESCRIPTION OF THE PREFERRED EMBODIMENTS

Figure 1:
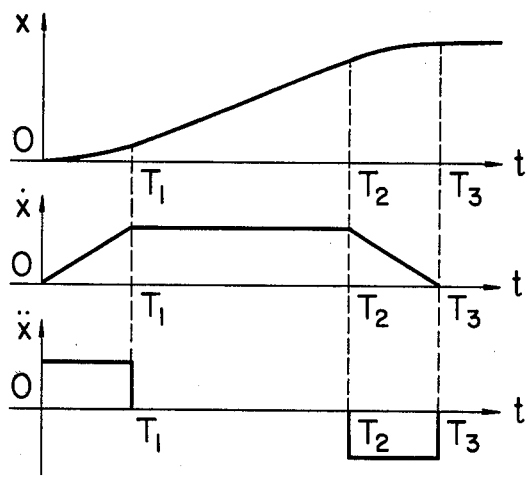
FIG. 1 is a diagram showing how a position servomechanism, to which the present invention is applied, operates to move a controlled object to the desired position.

Preferred embodiments of the present invention will now be described in detail with reference to the drawings. Herein, the velocity feedback circuit of the present invention is applied to a position servomechanism of on-off type, by way of example. Such an on-off type position servomechanism operates in a manner as shown in FIG. 1. Referring to FIG. 1, the symbols x, ẋ and ẍ designate the desired displacement of a controlled object to the desired position, the desired velocity of the moving controlled object to the same desired position, and the desired acceleration of the moving controlled object to the same desired position, respectively. The position servomechanism starts to move the controlled object at time 0 and then accelerates it with a desired acceleration x which is constant till time $T_1$. From time $T_1$ to time $T_2$, the desired velocity ẋ is constant, and the desired acceleration ẍ is therefore zero. Thereafter, from time $T_2$ to time $T_3$, the position servomechanism operates to decelerate the controlled object with a constant negative acceleration ẍ (or deceleration) until finally the controlled object is stopped at time $T_3$.

Figure 2:
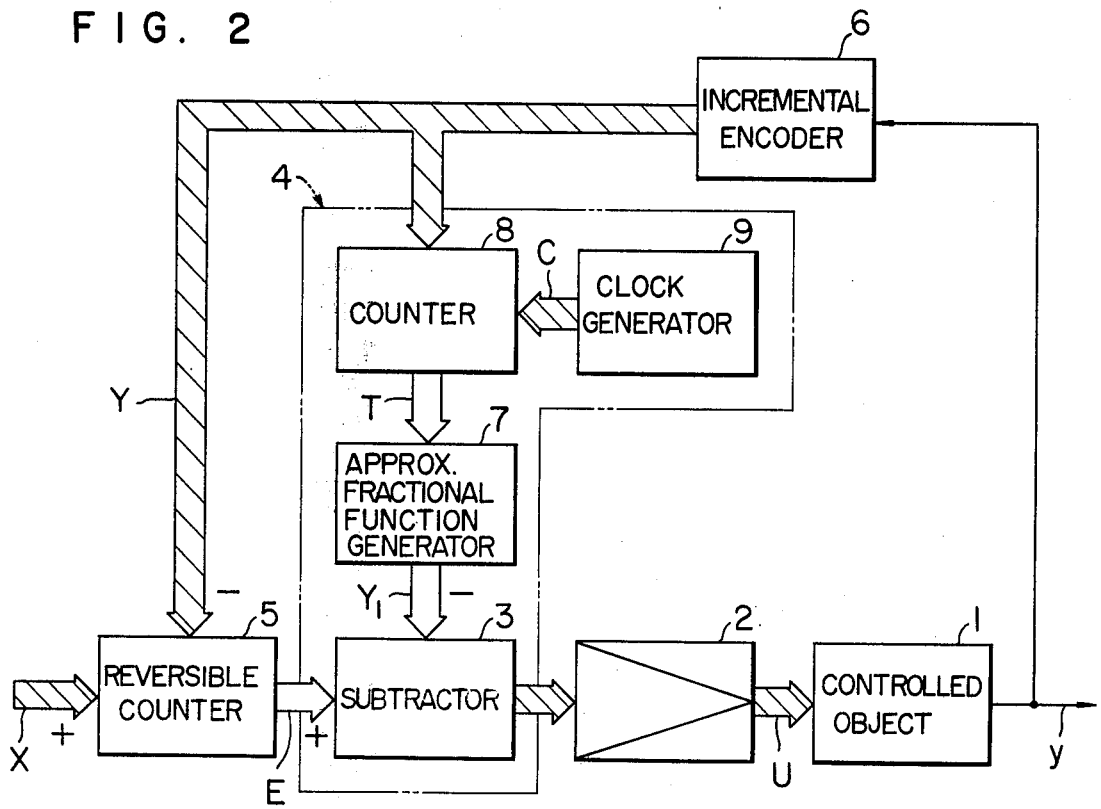
FIG. 2 is a block diagram showing the structure of the position servomechanism provided with an embodiment of the velocity feedback circuit according to the present invention.

FIG. 2 shows the structure of the position servomechanism provided with an embodiment of the velocity feedback circuit according to the present invention. In FIG. 2, signals shown by unhatched thick arrows indicate that they are digital signals, signals shown by hatched thick arrows indicate that they are digital pulse-train signals, and a signal shown by fine arrows indicate that they are analog signals.

The block diagram shown in FIG. 2 includes a controlled object 1 which may be a motor and its load, an amplifier 2 amplifying a manipulated variable or actuating signal U applied to the controlled object 1, a subtractor circuit 3 which is one of the elements constituting the velocity feedback circuit designated generally by the reference numeral 4, a reversible counter 5, and an incremental encoder 6. In addition to the subtractor circuit 3 described above, the velocity feedback circuit 4 includes an approximate fractional function generating element 7, a counter element 8 and a clock oscillator 9.

A train of pulse signals X indicative of the quantized desired displacement of the controlled object 1 is applied to the addition or count-up input terminal of the reversible counter 5, and another train of pulse signals Y indicative of the quantized actual displacement the controlled object 1 is applied to the subtraction or count-down input terminal of the reversible counter 5 from the incremental encoder 6 which is a position detector. In response to the application of these input signals X and Y, a digital output signal E indicative of the quantized position error appears from the reversible counter 5 to be applied to the subtractor circuit 3. On the other hand, the output signal Y from the incremental encoder 6 is also applied to the counter element 8 in the velocity feedback circuit 4 for controlling the counter element 8. This counter element 8 counts clock pulses of the clock signal C applied from the clock oscillator 9. In response to the rising waveform portion of each of the pulses applied from the incremental encoder 6, the counter element 8 stores the count into a register (not shown) provided therein, while the counter element 8 is renewed or cleared. The content of this register corresponds to the time interval T of the pulses generated at every quantization period from the incremental encoder 6 and is applied to the approximate fractional function generating element 7. In this approximate fractional function generating element 7, the quantization unit R 6 is divided by the time interval T between the pulses appearing in the end of each of the successive quantizing periods from the incremental encoder 6 so as to calculate the velocity ω. This calculation is expressed by the following equation (1):

$$\omega = R/T \quad (1)$$

Although the velocity ω can thus be calculated according to the equation (1), a divider circuit is required for this purpose. Also, due to the fact that the period of time required for division by the divider circuit provides a source of delayed velocity feedback, it is not necessarily effective to construct the velocity feedback circuit in the form which includes such a divider circuit. In the division according to the equation (1), the unit of quantization R, which is a constant, is the divident, and the result of division provides necessarily a certain fractional function. It is therefore preferable that, in lieu of execution of the division, digital circuit elements are employed for generating an approximate fractional function so as to obtain the aforementioned value of the quotient of division by approximation. In this form, the approximate fractional function generating element 7 executes the division according to the equation (1) by approximation, and a digital signal $\dot{Y}_1$ indicative of the approximate value of quantized velocity appears from the approximate fractional function generating element 7 to be applied to the subtractor circuit 3. In the subtractor circuit 3, the approximate value of velocity $\dot{Y}_1$ is subtracted from the position error E applied from the reversible counter 5, and a digital output signal indicative of the difference therebetween appears from the subtractor circuit 3. This signal is amplified by the amplifier 2 and is then applied to the controlled object 1 as a manipulated variable or actuating signal U. The controlled object 1 responds to a changing level of the manipulated variable U to be moved toward and positioned at the corresponding position y which is the controlled variable.

Figure 3:
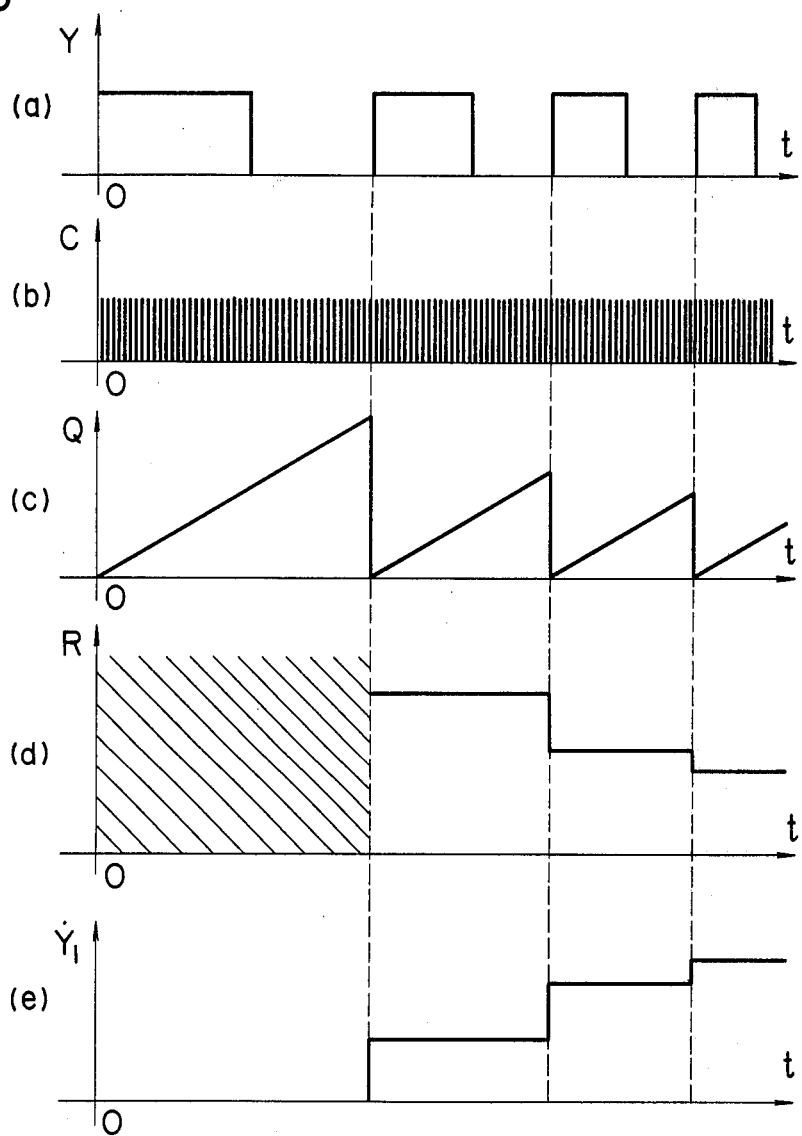
FIG. 3 is a time chart illustrating the operation of the embodiment of the velocity feedback circuit of the present invention shown in FIG. 2.

FIG. 3 is a time chart illustrating the operation of the velocity feedback circuit 4 having the structure above described. FIG. 3 illustrates the situation until the position servomechanism is started from its standstill state. FIG. 3 shows in (a) how the output signal Y from the incremental encoder 6 changes with time. FIG. 3 shows in (b) the train of clock pulses generated from the clock oscillator 9. FIG. 3 shows in (c) how the count Q of the counter element 8 changes with time and shows also that the count Q is renewed or cleared in response to the rising waveform portion of each of the pulses of the output signal Y generated from the incremental encoder 6. FIG. 3 shows in (d) how the value R registered in the internal register of the counter element 8 changes with time and shows also that the value of R in the hatched area is insignificant. FIG. 3 shows in (e) how the approximate value of velocity $\dot{Y}_1$ derived from the approximate fractional function generating element 7 changes with time.

Figure 4:
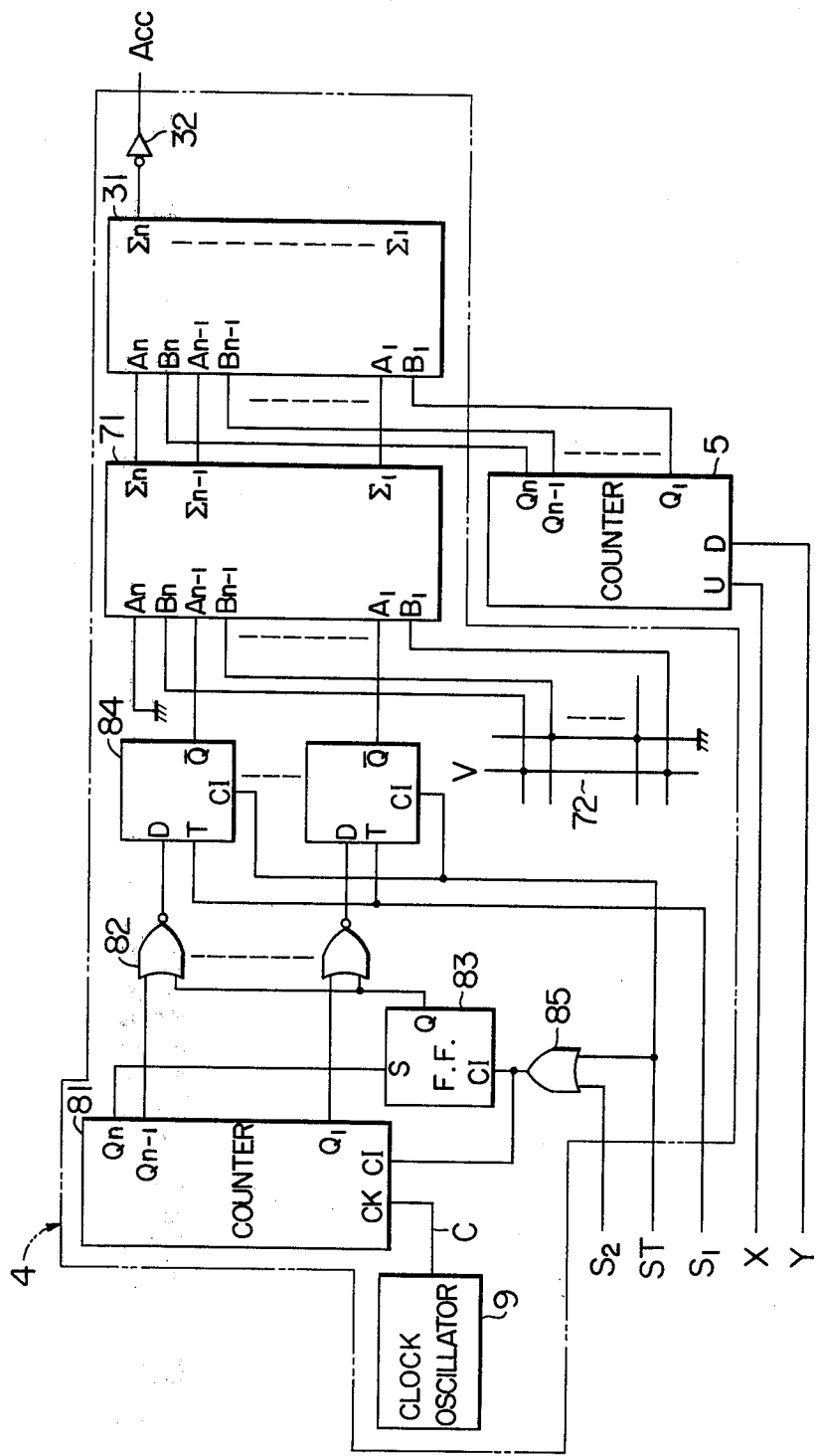
FIG. 4 is a circuit diagram showing in detail the structure of the velocity feedback circuit embodying the present invention.

The structure of the velocity feedback circuit 4 described above will be described in further detail with reference to FIG. 4 together with the practical structure of one form of the approximate fractional function generating element 7. In FIG. 4, the same reference numerals and symbols are used to designate the same parts and signals appearing in FIG. 2. Thus, the symbol X designates the digital pulse-train signal indicative of the quantized desired displacement of the controlled object 1, and the symbol 1 designates the output signal from the incremental encoder 6. The symbols S1 and S2 designate pulses generated in synchronism with the rise time of the signal Y designating the displacement of the controlled object, and these pulses S1 and S2 appear in the order of the former and the latter. The symbol ST designates a pulse generated at the starting time of the operation of the position servomechanism.

The output pulse signal C from the clock oscillator 9 is connected to the clock input terminal CK of a binary counter 81. The count of this binary counter 81 is cleared by the signal ST or S2 applied to its clear input terminal Cl through an OR element 85. A flip-flop 83 acts as an overflow flag element and is set when an overflow from the output terminal $Q_n$ of the binary counter 81 occurs due to the fact that the count of the counter 81 exceeds the range of $n-1$ bits allotted to its output terminals $Q_1$ to $Q_{n-1}$. This overflow flag element 83 is also cleared by the signal ST or S2 applied to its clear input terminal Cl through the OR element 85. The output terminals $Q_1$ to $Q_{n-1}$ of the binary counter 81 are connected to one of the input terminals of a group of NOR elements 82 respectively. The group of NOR elements 82 are commonly connected at the other input terminal to the output terminal Q of the flip-flop 83.

Because of the above-mentioned manner of connection, a "0" appears at each of the output terminals of the NOR element group 82 when the overflow flag element 83 is set, while an inverted equivalent of the value appearing at the output terminals $Q_1$ to $Q_n$ of the binary counter 81 appears at the corresponding output terminals of the NOR element group 82 when the overflow flag element 83 is cleared. The output terminals of the NOR element group 82 are connected to the data input terminals D of a group of latch registers 84 respectively. The signal S1 is connected to the trigger input terminal T of each of the latch register group 84. A "1" appears at each of the output terminals Q of the latch register group 84 when the overflow flag element 83 is set, while the value appearing at the output terminals $Q_1$ to $Q_{n-1}$ of the binary counter 81 appears at the corresponding output terminals Q of the latch register group 84 when the overflow flag element 83 is cleared. The output terminals Q of the latch register group 84 are connected correspondingly respectively to the group of input terminals $A_1$ to $A_{n-1}$ of a binary adder 71. A constant setting circuit 72 sets a "1" at the other input terminals corresponding to the most significant bits and least significant bit among the other input terminal group $B_1$ to $B_n$ of the binary adder 71 and sets a "0" at the remaining of the other input terminal group $B_1$ to $B_n$. Thus, the value $-\dot{Y}_1$ obtained by inversion of the sign of the approximate value $\dot{Y}_1$ of velocity appears at the output terminal $\Sigma_1$ to $\Sigma_n$ of the binary adder 71. The output terminals $\Sigma_1$ to $\Sigma_n$ of the binary adder 71 are correspondingly respectively connected to the group of input terminals $A_1$ and $A_n$ of another binary adder 31, and the output terminals $Q_1$ to $Q_n$ of the reversible counter 5 are correspondingly respectively connected to the group of the other input terminals $B_1$ to $B_n$ of the binary adder 31. Thus, the value obtained by subtracting the approximate value $\dot{Y}_1$ of velocity from the position error E appears at the output terminals $\Sigma_1$ and $\Sigma_n$ of the binary adder 31. A "1" appears at the output terminal $\Sigma_n$ corresponding to the most significant bit among the output terminals of the binary adder 31 when the difference between E and $\dot{Y}_1$ is negative, while a "0" appears when the difference is positive or zero. Thus, the signal obtained by inverting the most significant bit by a NOT element 32 is used as the output voltage $A_{cc}$ applied to the amplifier 2 (FIG. 2), so that the arrangement shown in FIG. 4 provides the function of velocity feedback means for the position servomechanism carrying out the on-off operation.

The principle of velocity calculation by the velocity feedback circuit 4 shown in FIG. 4 will now be explained.

The velocity is calculated on the basis of the aforementioned equation (1). Since the operation mode of the position servomechanism is limited to that shown in FIG. 1, it will be practically sufficient when the velocity feedback function is effectively exerted in the vicinity of the range in which the position servomechanism is operating at its steady speed. Suppose that the incremental encoder 6 generates pulses at time intervals To when the servomechanism operates at the steady speed. Then, when the equation (1) is linearized with the value of T set to be about $T=T_o$, the velocity $\Sigma$ is now expressed as $$\omega \doteq -\frac{R}{T_o^2} \cdot T + \frac{2R}{T_o} \qquad (2)$$

Figure 5:
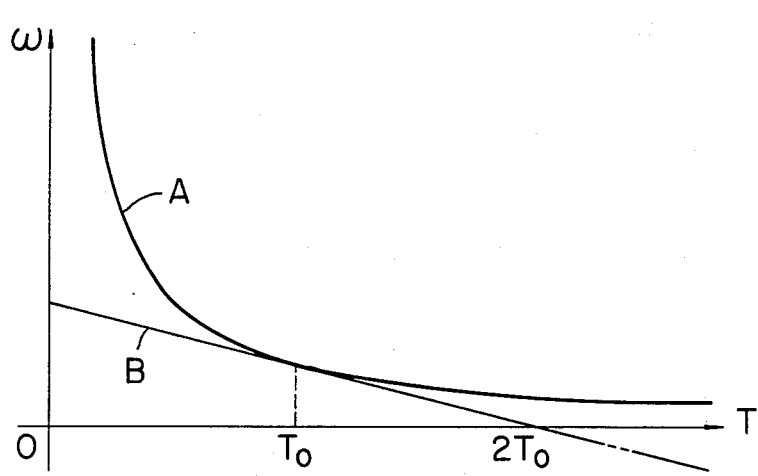
FIG. 5 is a graph illustrating the principle of velocity calculation in the velocity feedback circuit embodying the present invention.

The value of $\omega$ thus calculated is plotted relative to T in a graph shown in FIG. 5. In the graph of FIG. 5, the curve A is obtained according to the equation (1), while the straight line B is obtained according to the equation (2). In the velocity feedback circuit 4 according to the present invention, the velocity $\omega$ is calculated on the basis of the straight line B which is substituted for the curve A, although the velocity $\omega$ should primarily be calculated on the basis of the curve A. However, because of the problem that the sign of the feedback velocity will be inverted in the range where the value of T exceeds 2To when the equation (2) is directly used for the calculation, the value of $\omega$ is set at $\omega=0$ in the range of $T>2T_o$. The correspondence between the graph of FIG. 5 and the circuit diagram shown in FIG. 4 will be explained. The output from the latch register group 84 corresponds to the first term of the equation (2), and the output from the constant setting circuit 72 corresponds to the second term of the equation (2). From the viewpoint of processing, switching-over of the output from the NOR element group 82 in response to the detection of an overflow from the binary counter 81 corresponds to the selection of $T=2T_o$ as the break point.

Although the velocity feedback circuit 4 embodying the present invention is constructed to approximate the fractional function on the basis of the polygonal or broken line composed of the portions of the two straight lines A and B, it may be so constructed that the fractional function is approximated on the basis of a broken line composed of more straight lines. However, with the increase in the number of straight lines, the circuitry will become correspondingly complex, and yet, the effect of the velocity feedback circuit will not be appreciably improved. Therefore, the velocity feedback circuit is preferably so constructed as to be appropriate from the aspect of practical use.

Figure 6:
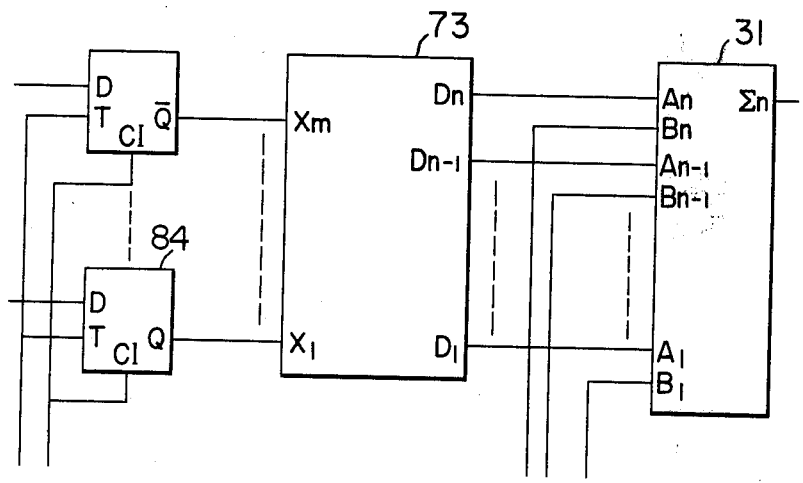
FIG. 6 is a partial circuit diagram to show a modification in which a memory element is used to constitute the approximate fractional function generating element employed in the velocity feedback circuit embodying the present invention.

FIG. 6 shows another form of the approximate fractional function generating element in the velocity feedback circuit according to the present invention. In the form shown in FIG. 6, the approximate fractional function generating element 7 shown in FIG. 2 is not provided by the arithmetic circuit but is provided by an element storing various values of the fractional function. More precisely, although the approximate fractional function generating element shown in FIG. 4 is provided by the combination of the binary adder 71 and the constant setting circuit 72, that element is provided by an element storing various values of the fractional function in the form shown in FIG. 6.

Referring to FIG. 6, a read-only memory element 73 stores various values of the fractional function. The output terminals $\overline{Q}$ of the latch register group 84 are connected to the address input terminals $X_1$ to $X_m$ respectively of the read-only memory element 73. Various numerical values of velocity to be fed back are stored in the individual storage areas of the read-only memory element 73. A selected one of these numerical values appears at the data output terminals $D_1$ to $D_n$ of the read-only memory element 73. The data output terminals $D_1$ to $D_n$ of the read-only memory element 73 are correspondingly respectively connected to the input terminals $A_1$ to $A_n$ of the binary adder 31. Therefore, in the binary adder 31, the data applied to the input terminal group $A_1$ to $A_n$ is subtracted from the position error data applied to the other input terminal group $B_1$ to $B_n$. According to the modification shown in FIG. 6, the fractional function can be reproduced with high fidelity over a relatively wide range.

The aforementioned embodiments have been described with reference to their application to a position servomechanism adapted for repeating its movement in one direction only. Generally, however, a position servomechanism is designed to be capable of making movement in bilateral directions. The velocity feedback circuit according to the present invention is also applicable to such a position servomechanism. One form of such a position servomechanism including the velocity feedback circuit according to the present invention is shown in FIG. 7.

Figure 7:
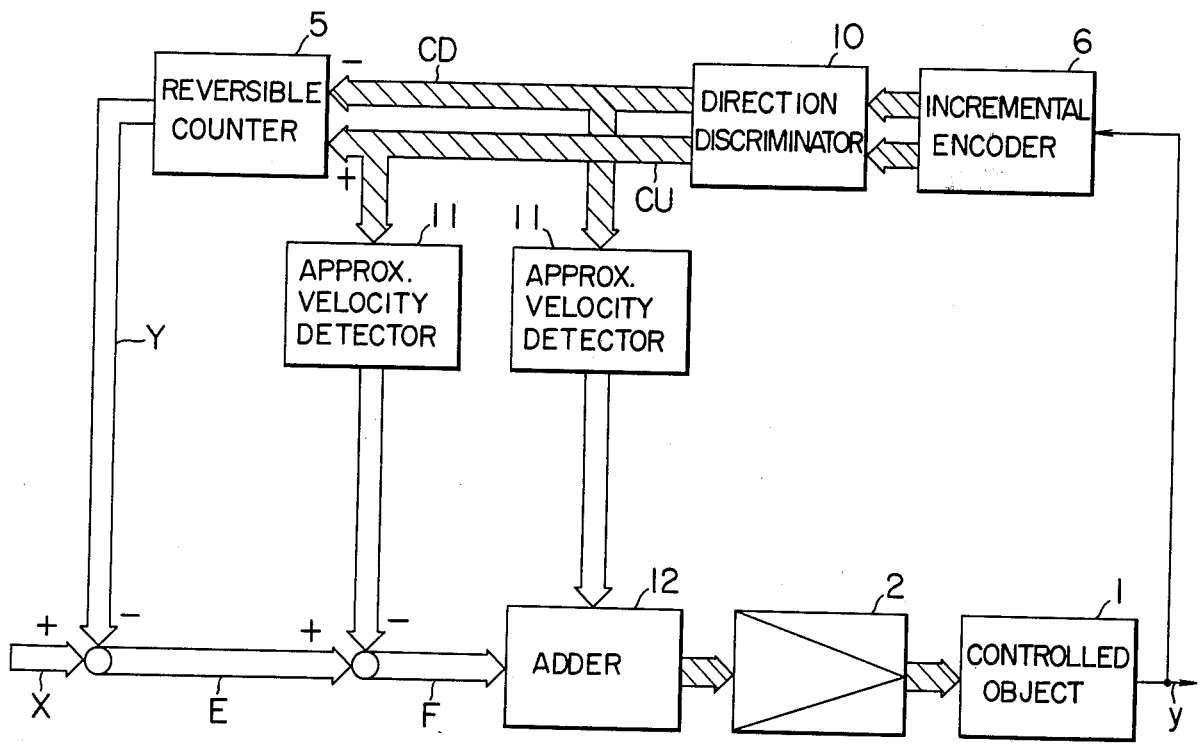
FIG. 7 is a block diagram showing application of the velocity feedback circuit of the present invention to a position servomechanism constructed to make bidirectional movement.

Referring to FIG. 7, the signal y indicative of the displacement, which is the controlled variable of the controlled object 1, is converted by the incremental encoder 6 into two quantized trains of pulse signals. These two pulse-trains are then converted in a direction discriminating circuit 10 into two trains of pulse signals CU and CD respectively indicative of the quantized positive displacement and quantized negative displacement of the controlled object. The two parallel output signals CU and CD from the direction discriminating circuit 10 are applied to the addition or count-up input terminal and subtraction or count-down input terminal of the reversible counter 5 respectively. Therefore, the count of the reversible counter 5 is indicative of the quantized actual displacement Y of the controlled object 1. In the position servomechanism, the pulse-train signal X indicative of the quantized desired displacement of the controlled object 1 is applied to the subtractor circuit in which the quantized actual displacement Y is subtracted from the quantized desired displacement X to provide the position error E. On the other hand, the pulse-train signal CU indicative of the quantized positive displacement is applied to a first approximate velocity detecting unit 11 which includes the clock oscillator 9, counter element 8 and approximate fractional function generating element 7 described with reference to FIG. 2. The output signal from this approximate velocity detecting unit 11 is subtracted in a subtractor circuit from the position error signal E to provide a difference signal F to be applied to an adder circuit 12. The above arrangement constitutes the velocity feedback circuit dealing with the positve displacement of the controlled object 1 actuated by the position servomechanism. Similarly, the pulse-train signal CD indicative of the quantized negative displacement is applied to a second approximate velocity detecting unit 11 of the same structure as the first unit 11. The output signal from this second approximate velocity detecting element 11 is also applied to the adder circuit 12 to be added to the signal F. The above arrangement constitutes the velocity feedback circuit dealing with the negative displacement of the controlled object 1 actuated by the position servomechanism. The amplifier 2 acts to provide a positive output voltage when the result of addition is positive, and a negative output voltage when the result of addition is negative. No output voltage appears from the amplifier 2 when the result of addition is zero. Of course, a dead zone may be provided as required. The controlled object 1, which may be a motor and its load, responds to the actuating signal applied from the amplifier 2.

It will be understood from the foregoing detailed description that the present invention eliminates the necessity for provision of a separate velocity detector, and the velocity feedback circuit can be wholly composed of digital circuit elements, so that the velocity feedback circuit, which requires no adjustment and can operate with stable feedback performance, can be easily constructed. Therefore, the present invention can improve the operating characteristic of a position servomechanism including a position detector with quantization.

We claim:

1. A velocity feedback circuit for a position servomechanism operative to control the position of a controlled object, said velocity feedback circuit comprising velocity calculating means responsive to a position signal applied from said position servomechanism for calculating the velocity to be fed back to the input of said position servomechanism, said velocity calculating means comprising first means for measuring the time required for said controlled object to make a predetermined change, second means for dividing the predetermined change of said controlled object by the time measured by said first means, thereby calculating the velocity, and third means for subtracting the velocity calculated by said second means from the position signal applied from said position servomechanism.

2. A velocity feedback circuit as claimed in claim 1, wherein said second means is a dividing element executing said division for calculating the velocity.

3. A velocity feedback circuit as claimed in claim 1, wherein said second means is a unit which calculates the velocity by reference to a fractional function stored in a memory element and determined by the relation between said predetermined change and said time.

4. A velocity feedback circuit as claimed in claim 1, wherein said second means is an arithmetic unit which calculates an approximate value of the velocity by using a linear approximate expression of a fractional function determined by the relation between said predetermined change and said time.

5. A velocity feedback circuit as claimed in claim 4, wherein said linear approximate expression used for calculation in said arithmetic unit is composed of a first linear approximate expression which gives the approximate value of the velocity in the vicinity of the steady operating state of said position servomechanism when said servomechanism operates to actuate said controlled object at a constant velocity after being started and a second linear approximate expression in which the approximate value of velocity is set at zero in the region in which the approximate value of velocity calculated according to said first linear expression has a sign different from that of the velocity.

* * * * *